March 6, 1928. 1,661,863
W. E. WINE
FREIGHT CAR
Filed March 3, 1926 6 Sheets-Sheet 5

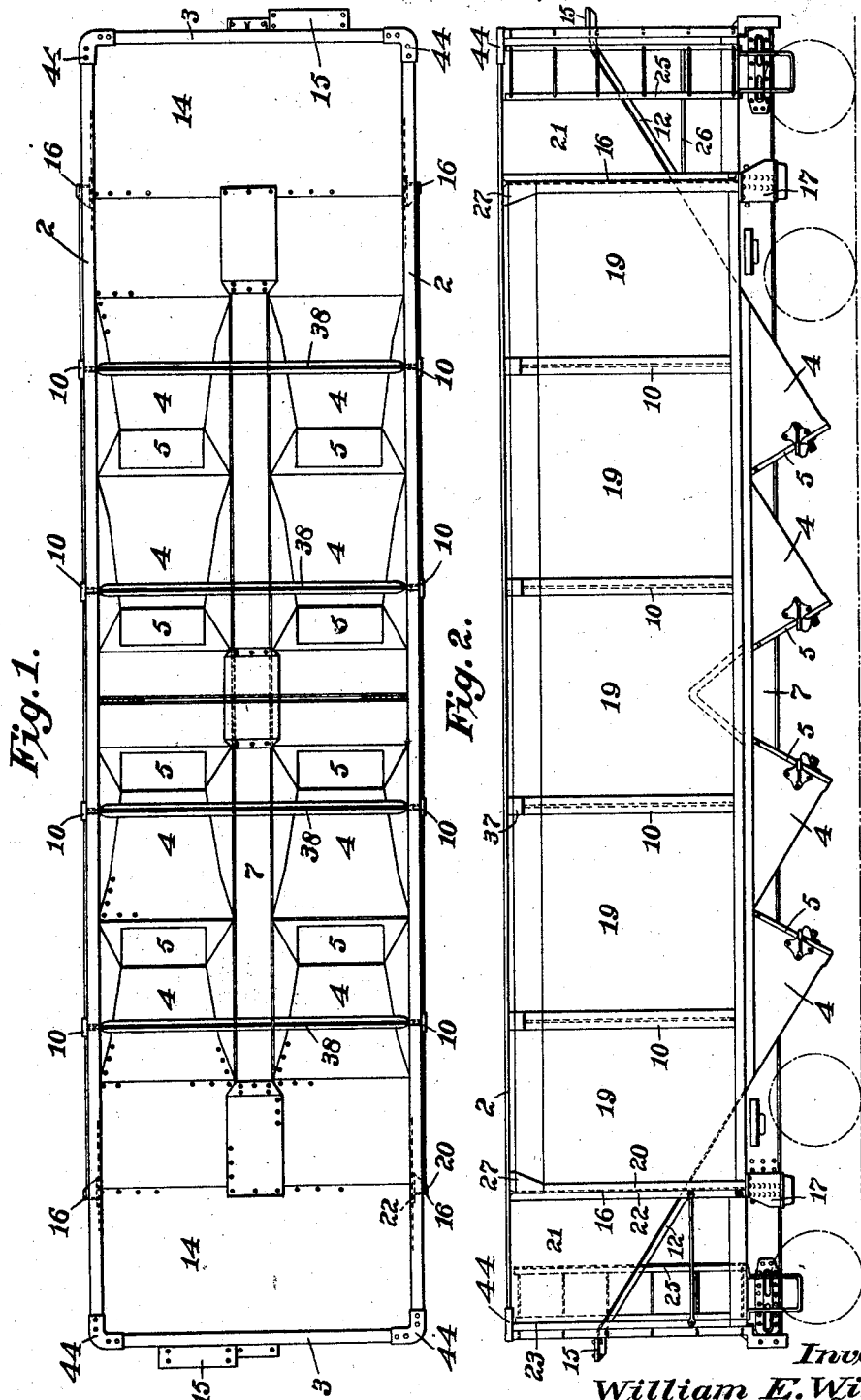

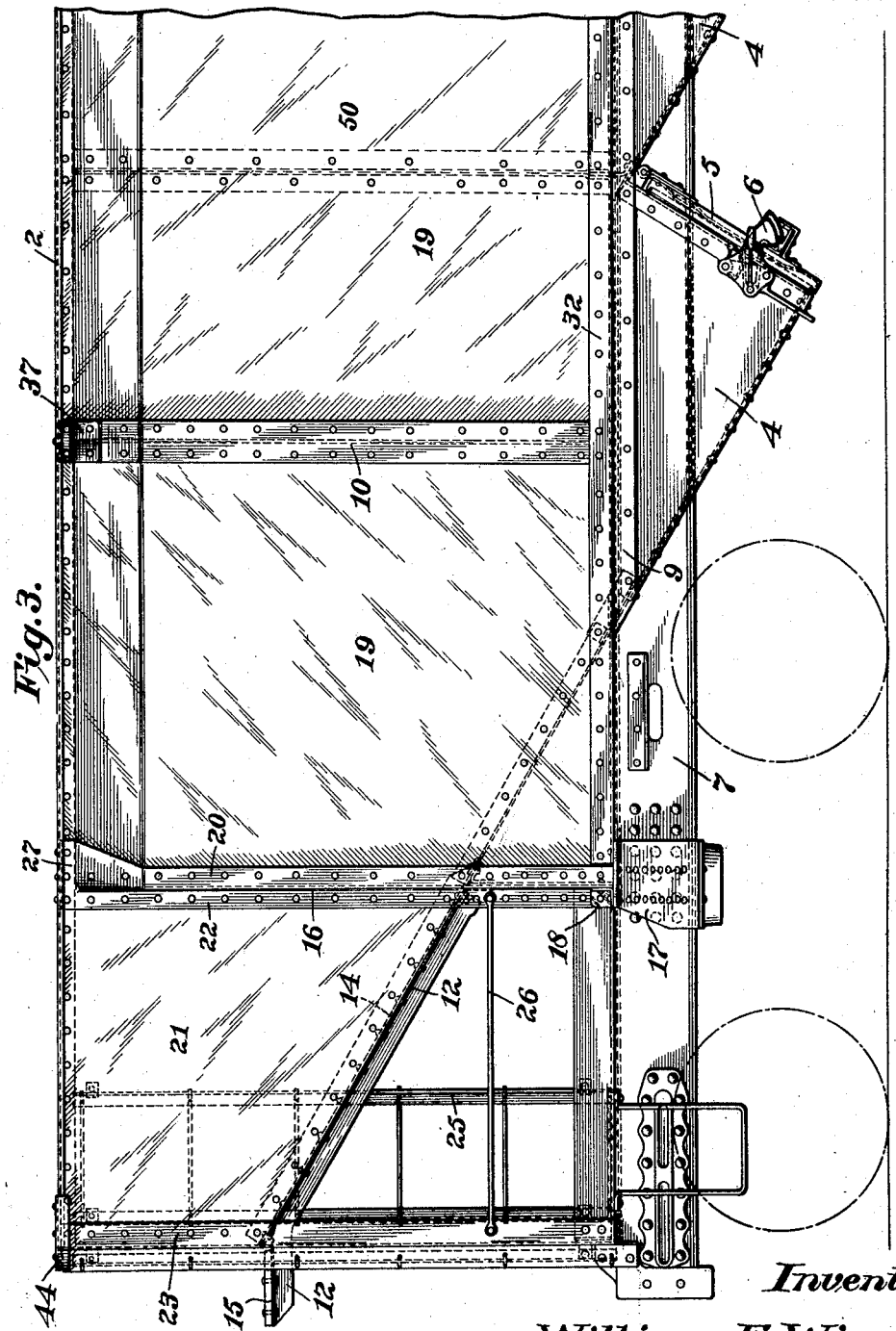

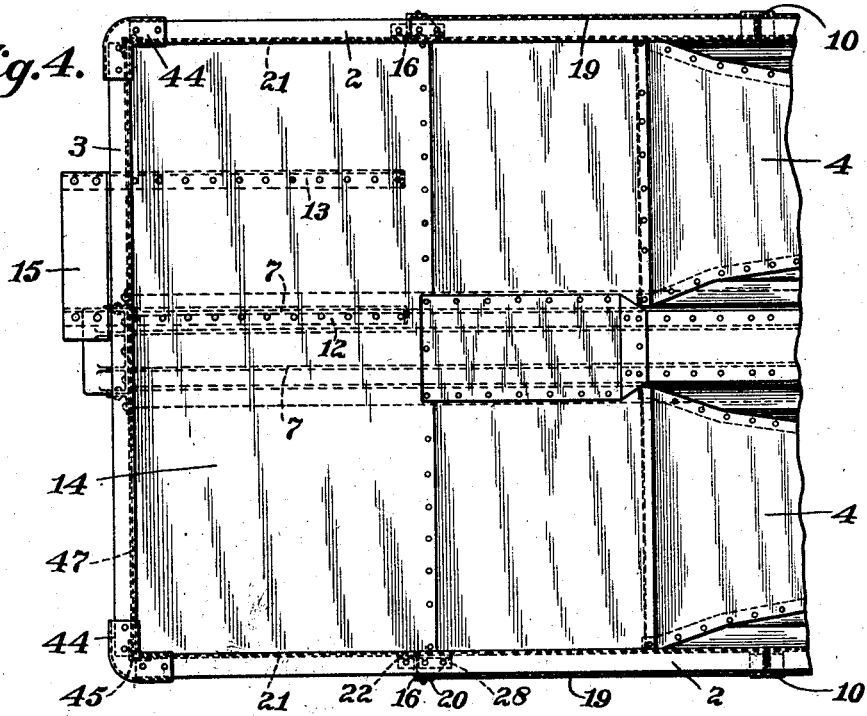
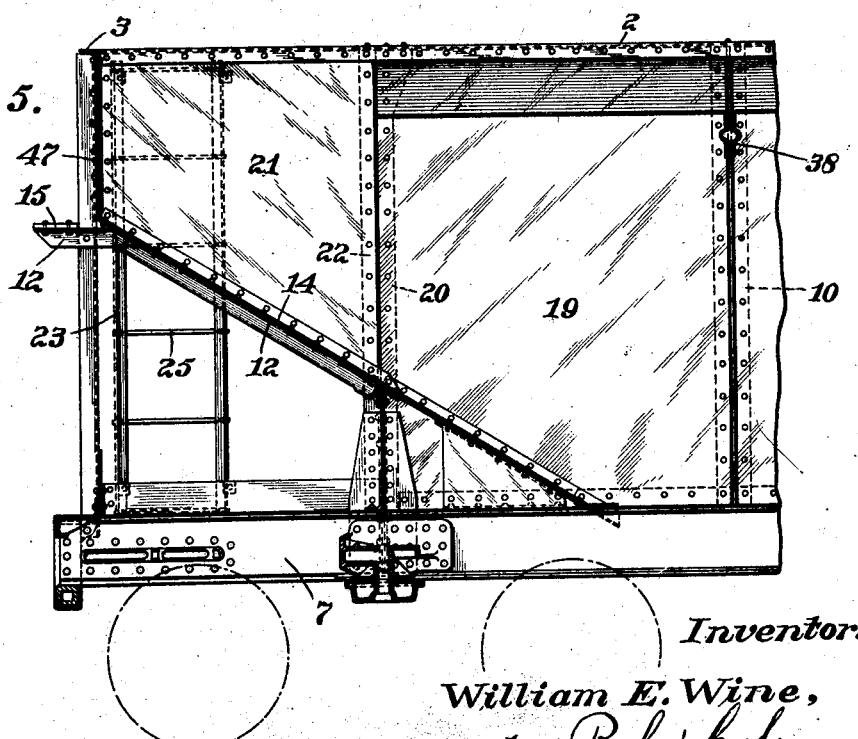

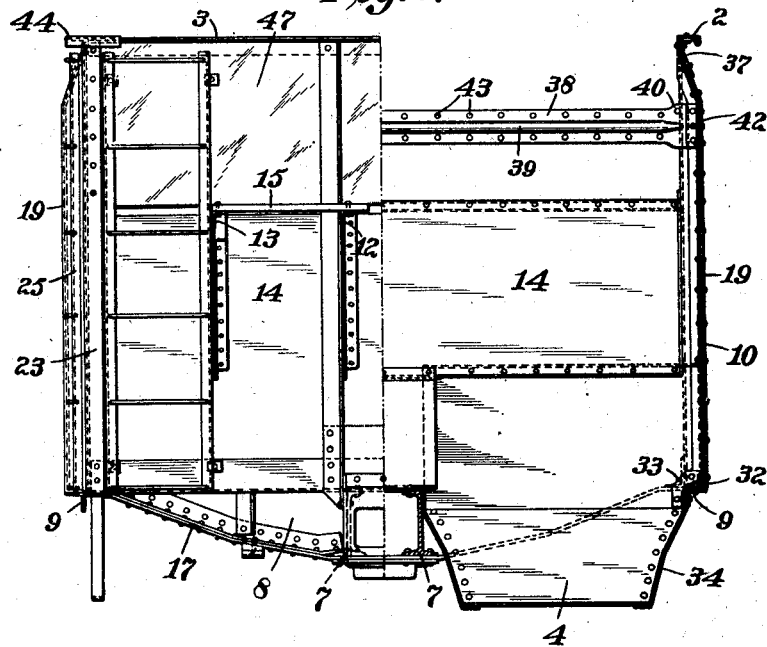
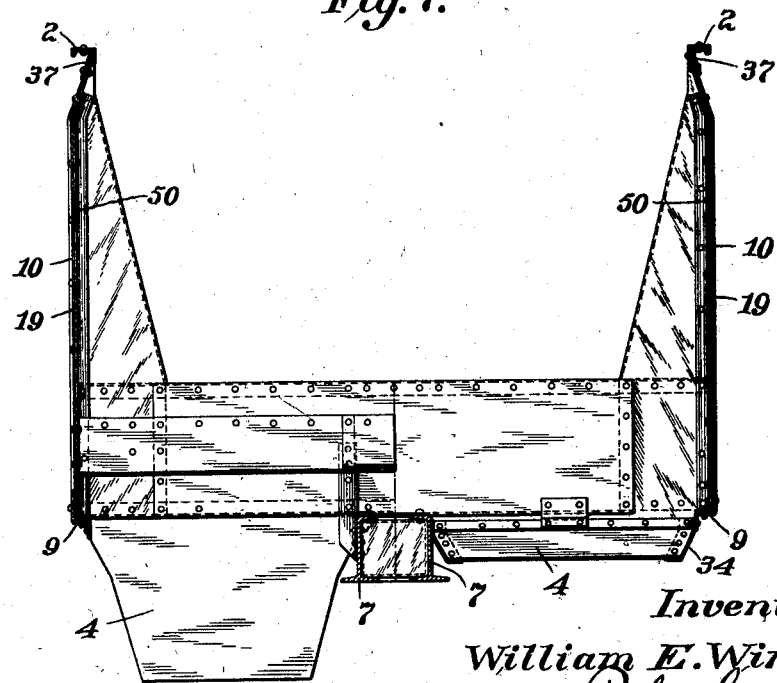

Inventor:
William E. Wine,
by Parker Cork
Atty.

March 6, 1928.
W. E. WINE
FREIGHT CAR
Filed March 3, 1926
1,661,863
6 Sheets-Sheet 6
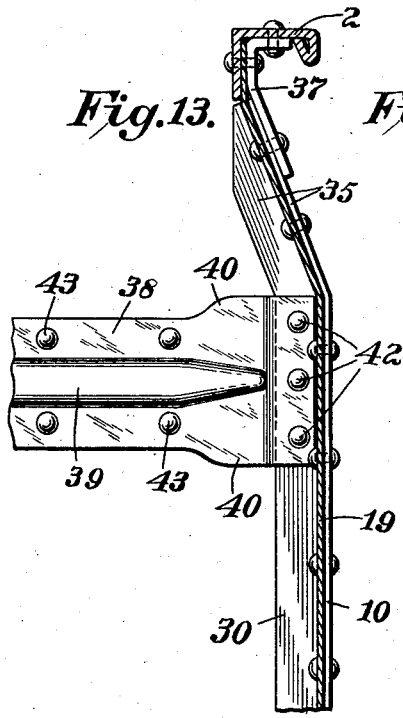
Fig. 13.
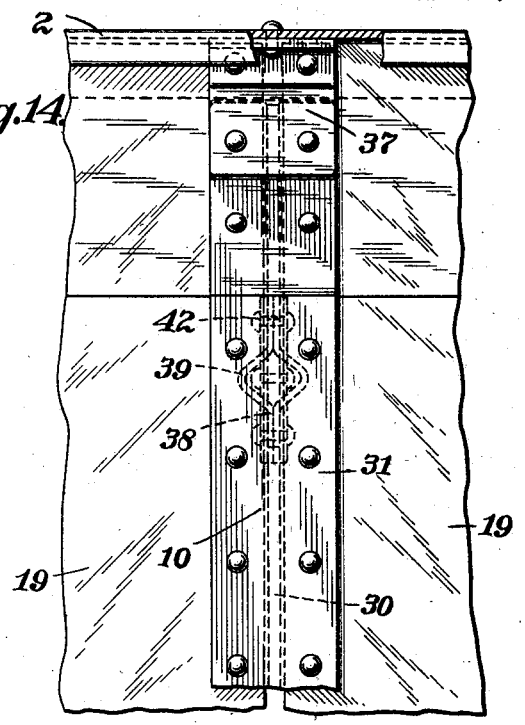
Fig. 14.
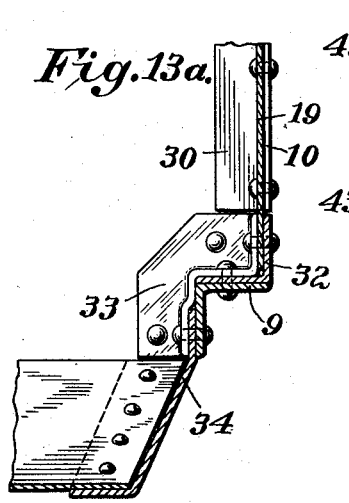
Fig. 13a.
Fig. 16.
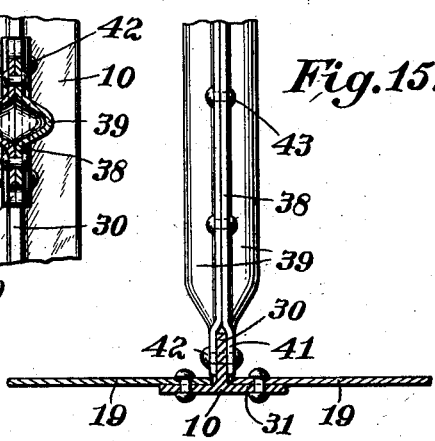
Fig. 15.
Inventor:
William E. Wine,
by Parker Cook
Atty.

Patented Mar. 6, 1928.

1,661,863

UNITED STATES PATENT OFFICE.

WILLIAM E. WINE, OF TOLEDO, OHIO, ASSIGNOR TO WINE RAILWAY APPLIANCE COMPANY, OF TOLEDO, OHIO, A CORPORATION OF OHIO.

FREIGHT CAR.

Application filed March 3, 1926. Serial No. 91,951.

My invention relates to new and useful improvements in freight cars and more particularly to a freight car of the hopper door type and has for an object to so arrange the frame, sides and ends that a maximum amount of load may be carried, while, at the same time, ample clearance will be provided at the opposite ends of the car for the ladders, grab-irons or safety appliances.

Many different forms of freight cars of the gondola or hopper door type have been designed with sloping or tapering sides so that the ladders and grab-irons will not extend out beyond the sides of the car and in most instances the taper is such that it reduces the capacity of the car.

Furthermore, it is desirable, if possible, to keep the lines or sides of the car straight, or to provide some arrangement whereby the stresses and strain throughout the length of the car will be in substantially a straight line.

Another object of the invention, therefore, is to provide a freight car wherein the maximum cubic capacity may be retained, and this is accomplished by the use of Z-bars installed near the opposite ends of the car so that rather than tapering the cars near their opposite ends, the sides will be parallel throughout their length to the point or location of these Z-bars and after which the sides will extend parallel to each other, but each in a parallel plane with the inner legs of the Z-bars, thus providing a space for the ladders and other appurtenances.

Still another object of the invention is to provide a freight car with what might be termed "offset ends" wherein the maximum cubic contents is retained to as great a degree as possible and wherein the structure is also transversely braced to provide as strong a structure as possible.

Still another object of the invention is to so arrange and construct the upper edges of the sides of the car whereby the same are strengthened throughout their length, which is desirable, not only for the ordinary usage but especially where the cars are loaded on a platform and bodily tipped to empty the car in a few seconds.

Still another object of the invention is to provide a freight car wherein the sides and frame and bracing all cooperate to provide a maximum capacity, to provide nearly straight lines throughout the length of the car, and at the same time provide the clearances at the opposite ends of the car for the ladders and grab-irons.

With these and other objects in view, the invention consists in certain new and novel arrangements and combination of parts as will be hereinafter more fully described and pointed out in the claims.

Referring now to the drawings, showing a preferred embodiment of the invention,

Fig. 1 is a diagrammatic top plan view illustrating how the sides are parallel along their upper edges, and where the Z-bars and T-stakes are located.

Fig. 2 is a diagrammatic side elevation showing the arrangement of the hoppers.

Fig. 3 is a side elevation showing a fragmentary portion of a car and illustrating the manner of arranging the Z-bars in the opposite ends of the car to retain, as nearly as possible, the maximum capacity and at the same time, provide the necessary clearances.

Fig. 4 is a fragmentary top plan view showing the arrangement of the Z-bars located near the opposite ends of the car.

Fig. 5 is a sectional view, centrally of Fig. 4.

Fig. 6 is an end view, one half being in section.

Fig. 7 is a cross sectional view taken about in the center of the car.

Fig. 13 is a fragmentary view of a T-stake showing a side plate in section, a section of the top rail, and a fragmentary portion of a cross brace.

Figure 8:
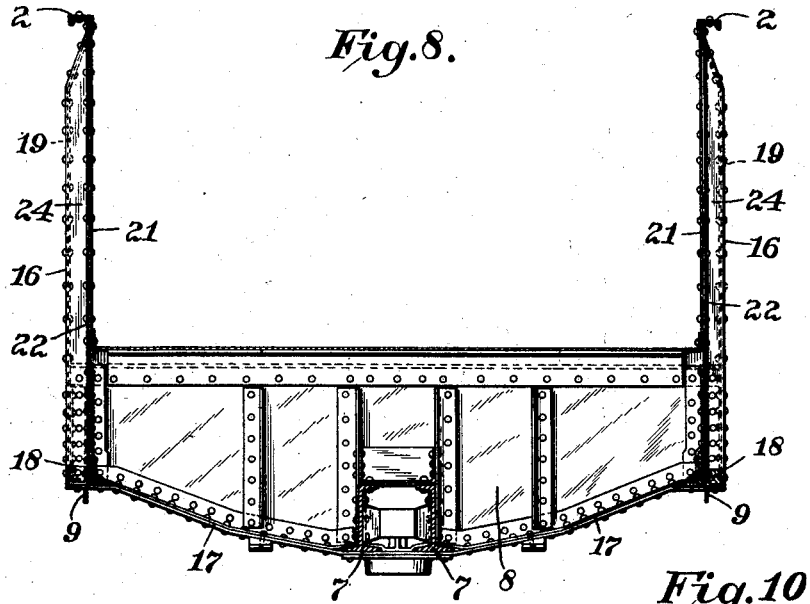
Fig. 8 is a similar cross sectional view taken just in front of the Z-bars to illustrate the structural details.

Fig. 13ᵃ is a fragmentary view, partly in section, showing the manner of fastening the T-stake at its lower end to the side sill.

Fig. 14 is a view partly in section showing a T-stake disposed between the side plates, showing the manner of fastening the top rail, and a dotted line showing of the cross brace.

Fig. 15 is a fragmentary top plan of a cross brace showing a T-stake and side plates in section, and Fig. 16 is a fragmentary view showing the cross brace in section attached to a T-stake.

Referring now more particularly to the several views, I have shown in a diagrammatic way in Figs. 1 and 2, my improved freight car provided with the upper rails 2, which act as stiffening members for the upper edges of the sides of the car.

End rails 3 are also shown and of course, hoppers 4 are provided with the doors 5 so that the coal may be discharged in the ordinary way. In Fig. 3, the hopper door hooks 6 are shown, but these, per se, form no part of the present invention.

As may be seen in Fig. 8, a conventional type of composite center sill 7 is shown, also a bolster 8 and the angle bars which form the side sills 9. Connected to these side sills are the upright angles 50 (see Fig. 7) that are riveted to the sides and in addition to these uprights there are the side stakes 10 and Z-bars 16, both of which will be shortly described in detail.

Inclined braces 12 and 13 are positioned at each end of the car supporting the inclined bottom sheet 14. As may also be seen in Fig. 4, the outer ends of these braces form a support or bracket for the small platform 15.

Figure 11:
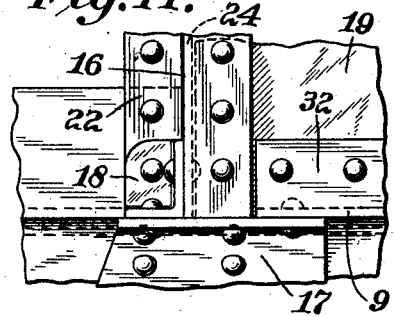
Fig. 11 is a fragmentary detail view showing the Z-bar braced at its lower end to the side sills.

As may be seen in Fig. 11 the upper member of the side sills 9 terminates at the bolster and abut an upright Z-bar 16, there being two bars near each end of the car and located on the opposite sides. These four Z-bars and the manner in which they are formed into shape, together with the arrangement of the T-stakes and their cross braces, and the upper rails form the principal subject matter of this invention.

As before mentioned, the upper member of the side sills 9 at its opposite ends is secured as at 17 to the bolster 8 and the Z-bars also are positioned directly above the bolster and adjacent the ends of the side sills. A small bracket 18 is secured by a rivet to a leg and web of the Z-bar, and to the aforementioned plate 17 to thus securely brace the Z-bars and side sills.

On each side of the car, a plurality of side sheets 19 extend from one Z-bar to the other, the said plates 19 being riveted respectively to one leg 20 of the Z-bar, while the remaining extreme end side plates 21 extend from the other leg 22 of the Z-bar to the end posts 23 of the car, the width of the center web 24 of the Z-bar representing the depth of the inset at the two opposite sides of the car. In this space may be placed ladders 25, grab irons 26, or any of the other safety appliances.

Figure 9:
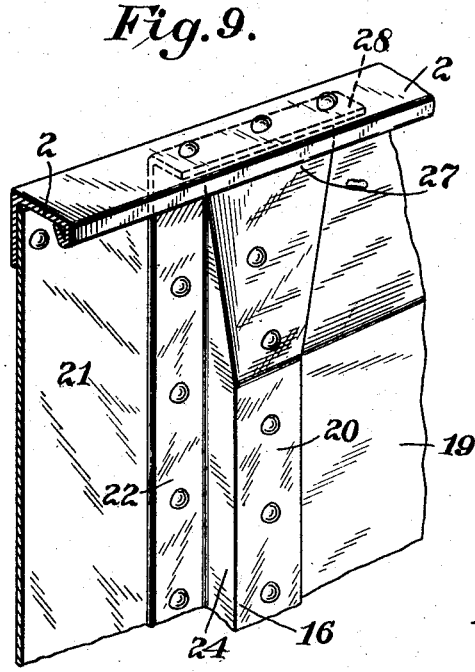
Fig. 9 is a fragmentary perspective showing a Z-bar and the manner of fastening the same to the sides, and also showing the top side rail.
Figure 10:
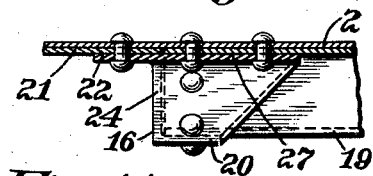
Fig. 10 is a fragmentary view partly in section, showing the manner of flattening out the upper edges of the Z-bars.

The constructions or formation of the Z-bar at its upper edge is of great importance, and is well illustrated in the perspective view, Fig. 9.

As before mentioned, a side plate 19 is fastened by rivets to a leg 20 of the Z-bar and this leg and web 24 is first flattened out or compressed at its upper end, as may be seen at 27, the metal of the web 24 being forced to form the tapered portion as at 27 and then the entire upper end of the Z-bar in its flattened state is bent inwardly at right angles to form the rim 28, so that this rim in turn may fit under and be riveted to the upper rail 2.

The upper edges of the side plates 19 between their respective Z-bars slope inwardly as may be seen in the several views so that if the cars are placed on a platform and the contents bodily tipped from the cars, these sloping sides will assist in the egress of the coal.

It will be understood that I have only described the characteristics of one of the Z-bars, but all four of them are identical. It will also be seen that by so reducing the opposite ends of the car, in the manner described, a maximum space will be provided for the cubic contents, and space will also be provided for the safety appliances. Furthermore, the upper edges of the sides of the car will be substantially parallel due to plate 21 not being bent inwardly, and thus the strain along the sides of the car will be transferred throughout substantially straight lines, which is, of course, desired.

Now, to provide an efficient form of bracing of the car throughout, there will next be described, the form of T-stakes and the cross bars which extend between the respective stakes.

Referring preferably to Figs. 1, 2 and 15, the side plates 19 of the car are shown (Fig. 15) as having their ends adjacent, but slightly spaced so that an upright T-stake 10 will have its web 30 extended within the car side, while the flange 31 of the T may be riveted to the respective plates 19.

The lower end of the T-stake abuts the angle 32 which forms a part of the side sill, and a small bracket plate 33 is shown overlapping the angle and the other part of the side sill, while between one leg of the angle 32 and the bracket plate 33 is riveted a portion or lower edge of the side plate 19, and also riveted to the lower portion of the side sill and bracket 33, is shown the brace 34 for the hopper sheet.

These T-stakes at their upper ends are inclined, as are the sides as heretofore mentioned, as shown at 35. Riveted to the T-stakes and side plates is a small bracket 37, which in turn is bent to fit beneath the rail 2 where it is then riveted, as may be seen in the several figures.

Both of the sides are identical, so that a description of one is a description of the other, and all of the T-stakes are similar to each other.

To transversely brace the sides of the car, I have shown a plurality of composite cross bars 38 each of which is made up of two cooperating strips of metal, and has a corrugation 39 formed in each part, which, of course, will greatly add to the strength of the cross brace. The opposite ends of these bars are flared as at 40 and the two strips which make up each cross bar, are slightly separated at their ends as at 41 so that they may receive the web 30 of the T-stake and may be riveted thereto as at 42. The two parts forming the cross piece are riveted as at 43 throughout their length, and these cross bars are riveted to each T-stake at a point where the T-stake starts its inclination. The flanges of the T-stakes, of course, will be riveted throughout their length to the side plates 19, as may be clearly seen in Fig. 14.

Figure 12:
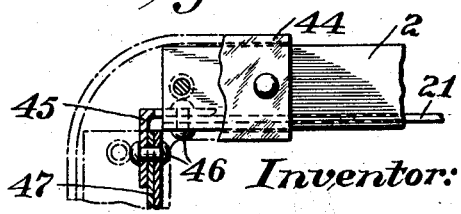
Fig. 12 is a detail view showing the manner of securing the corners of the car.

In Fig. 12 I have shown a detail of a corner of the car, and it will be noticed that unions or corner brackets 44 are provided and that vertical end posts 45 are also used which are riveted as at 46 to the side plates 21 and end plates 47.

From the foregoing it will be seen that I have invented a freight car of the hopper door type, wherein four Z-bars are used near the respective ends of the car so that the space defined by these four Z-bars will be as large as possible. From the respective Z-bars to the extreme ends of the car, the the plates which form the sides of the car are fastened to the inner adjacent legs of the Z-bars, thus providing a clearance for the necessary safety appliances.

Between the respective Z-bars and extending transversely of the car, there are a plurality of cross-pieces which in turn are secured to specially formed T-stakes, the T-stakes having their flanges on the outer surfaces of the sides and the webs of the T-stakes extending through the adjacent edges of the plates and fitting within the ends of the cross bars. The upper edges of the sides are reinforced by rails which are riveted to the side sheets and brackets, and are parallel throughout their length.

The construction is one which is very desirable, inasmuch as a maximum load can be carried and at the same time the requisite clearance is provided for the safety appliances on the sides of the car near its ends.

I am aware that it is old to taper the ends of the car to provide a clearance, and I am aware that it is old to provide stakes on the outer sides of the car, but I am not aware of a construction wherein Z-bars and T-stakes are used as shown to provide a car, the advantages of which have above been outlined.

Having thus described my invention, what I claim as new and desire to secure by Letters Patent is:—

1. A freight car having sides comprising spaced side plates and flanged bar stakes, the flanges of said stakes being secured to the side plates and the webs of the stakes extending within the spaces between the plates.

2. A freight car having a plurality of plates forming the sides of the car with their adjacent edges slightly spaced from each other, a plurality of T stakes having their flanges secured to the outside of said plates and the webs extending within the edges of the adjacent plates.

3. A freight car having a restricted end portion, a plurality of plates forming the sides of the car, a plurality of flanged bar stakes having their flanges riveted to the outside of said plates and their webs extending within the sides of the car.

4. A freight car having four angular stakes located near the respective corners, the sides of the car so fastened to said angular stakes as to provide restricted end portions, T stakes secured to the outside of the car sides with their webs extending inside the car body.

5. In a freight car of the hopper door type having four end posts, four angular posts placed adjacent the respective end posts, the extreme ends of the sides of the car extending between the end posts and a respective leg of the angle posts, the remaining portion of the sides extending between the other respective legs of the angle posts to thereby provide offset sides at the extreme ends of the car, T-stakes located on the opposite sides of the car and having a web extending between the side plates of the car and cross braces extending to the respective webs of the T-posts to thereby transversely brace the sides of said car.

6. A freight car of the hopper door type, including sides, the extreme ends of the sides being offset and parallel to each other, Z-bars defining the points of reduction of the sides, T-stakes located along the opposite outsides of the car, a web of each T-stake extending within the sides of the car, and cross braces extending between the webs of the respective T-stakes.

7. A freight car of the hopper door type, the sides of which are parallel throughout the major portion of their length and the extreme ends of the sides being slightly inset and extending parallel to each other to the respective ends of the car, angular posts defining the points of the reduction of the sides, a plurality of T-stakes each having a web extending between portions of the side of the car and cross braces respectively secured to the webs of the oppositely arranged T-stakes to thereby brace the sides of said car.

8. A freight car including sides, top rails secured along the upper edges of the sides and extending parallel throughout the length of the car, Z-bars located near the respective corners of the car, the major portion of the car extending between the outer respective legs of the Z-bars, the extreme ends of the sides extending from the respective inner legs of the Z-bars to the ends of the car to thereby provide space for safety appliances, the sides of the car provided with a plurality of plates, a plurality of T-stakes having a web extending inwardly between the respective plates, and cross bars having bifurcated ends secured to the oppositely positioned T-stakes to thereby brace the sides of the car.

9. A freight car having four upright Z-bars located near the respective corners of the car, a plurality of plates slightly spaced apart forming the sides of the car and secured to the respective Z-bars so that the sides are offset at their opposite ends to provide a space for safety appliances, a plurality of T-stakes for bracing the sides having their respective webs extending between said plates, brackets riveted to the stakes and the sides at their upper edges, and top rails along the top edges of the sides supported by said brackets.

10. A freight car having four upright Z-bars located near the respective corners of the car, a plurality of plates slightly spaced apart forming the sides of the car and secured to the respective Z-bars so that the sides are offset at their opposite ends to provide a space for safety appliances, the said Z-bars being flattened out at their upper portion and bent to form a ledge, a plurality of T-stakes for bracing the sides having their respective webs extending between said plates, brackets riveted to the stakes at their upper end and to the sides of the car, top rails extending along the said sides and supported by said brackets and the ledges of the said Z-bars.

11. A freight car having slightly offset ends to provide a space for safety appliances, a plurality of plates forming the sides of the car, their adjacent edges slightly spaced from each other, a plurality of T-stakes having their T flanges riveted to the outside of said plates and their web extending within the adjacent ends of the plates, and cross bars fastened to the webs of the oppositely located T-stakes.

12. A freight car having offset sides near their respective ends and formed by connecting the sides to properly positioned Z-bars, the sides formed of a plurality of plates whose adjacent edges are slightly spaced from each other, T-stakes having their flanges riveted to the outer sides of the plates and their webs passing between the adjacent edges of the plates, cross bars secured to the oppositely arranged T-stakes, top rails, brackets secured to the sides and to the T-stakes for supporting said top rails, and the Z-bars also arranged to support the said top rails.

13. A freight car having sides formed of a plurality of plates, T-stakes supporting the sides, the said T-stakes arranged on the outer sides of the car and having an integral web extending therethrough and braces extending between the oppositely located T-stakes, Z-bars located near the respective corners of the said car, the plates so fastened to the Z-bars as to form spaces at the extreme ends of the sides of the car for the reception of safety appliances, the upper edges of the sides slanting inwardly, a plurality of brackets secured to the sides, and top rails extending parallel throughout the entire length of the car and supported by said bracket.

14. A freight car having sides formed of a plurality of plates, T-stakes supporting the sides and braces extending between the oppositely located T-stakes, Z-bars flattened at their upper portion and bent to form a ledge, said Z-bars located near the respective corners of the said car, the plates so fastened to the Z-bars as to form spaces at the extreme ends of the sides of the car for the reception of safety appliances, the upper edges of the sides slanting inwardly, a plurality of brackets secured to the sides, and top rails extending parallel throughout the entire length of the car and supported by said brackets and said ledges.

15. A freight car having Z-bars near its respective ends, the sides of the car so fastened to the Z-bars as to provide offset sides at their extreme ends, the sides formed of a plurality of plates, T-stakes extending between the plates, cross bars secured to the respective T-stakes, and top rails supported indirectly by said T-stakes and directly by said Z-bars.

16. A freight car of the hopper door type having a plurality of interchangeable hoppers, said hoppers having outwardly sloping inside walls, inwardly sloping outside walls for attachment to said sloping inside walls, said car including sides, the extreme ends of which are offset and parallel to each other, Z bars, defining the points of reduction of the sides of the car, T stakes located along the opposite sides of the car, a web of each T stake extending within the sides of the car, and side sills connected to said Z bars and supporting the said hoppers along their one side by said inwardly sloping outside walls.

17. A freight car provided with a plurality of hoppers, said hoppers having outwardly sloping inside walls, side sills, inwardly sloping walls secured to said side sills and cooperating with the adjacent oppositely sloping inside walls of said hoppers to thereby support the same along their one side, said car provided with sides, the extreme ends of the car being offset, Z bars defining the points of reduction of the sides of the car, T stakes located along the opposite sides of the car, a web of each T stake extending within the sides of the car, and the Z bars connected to said side sills.

18. A freight car provided with a plurality of interchangeable hoppers, the sides of the car having its extreme ends offset and Z bars defining the points of reduction of the sides of the car, side sills, the hoppers having outwardly sloping inside walls, inwardly sloping walls connected to the side sills and secured to the sloping inside walls of the hopper on their one side, the side sills each comprising an upwardly and downwardly extending leg and a cross web formed integral with each of the said legs, said Z-bars also connected to said side sills.

19. A hopper car having reduced ends, side sills, plates extending inwardly from each of said side sills, hoppers having sloping outside walls, said walls secured to the sloping walls connected to the side sills, and said side sills each provided with an oppositely disposed leg and a cross web.

In testimony whereof I affix my signature.

WILLIAM E. WINE.